(12) United States Patent
Wöstmann et al.

(10) Patent No.: US 11,491,424 B2
(45) Date of Patent: Nov. 8, 2022

(54) FILTER ELEMENT FOR FILTERING A FLUID AND A FILTER UNIT FORMED THEREFROM

(75) Inventors: Stefan Wöstmann, Sassenberg (DE); Christian Schröder, Münster (DE)

(73) Assignee: NORDSON HOLDINGS S.A.R.L. & CO. KG, Erkrath (DE)

( * ) Notice: Subject to any disclaimer, the term of this patent is extended or adjusted under 35 U.S.C. 154(b) by 489 days.

(21) Appl. No.: 14/002,384

(22) PCT Filed: Mar. 2, 2012

(86) PCT No.: PCT/EP2012/053690
§ 371 (c)(1),
(2), (4) Date: Sep. 9, 2013

(87) PCT Pub. No.: WO2012/117114
PCT Pub. Date: Sep. 7, 2012

(65) Prior Publication Data
US 2014/0291231 A1  Oct. 2, 2014

(30) Foreign Application Priority Data
Mar. 2, 2011 (DE) ............ 10 2011 001 015.7

(51) Int. Cl.
*B01D 29/56* (2006.01)
*B01D 29/41* (2006.01)
(Continued)

(52) U.S. Cl.
CPC .......... *B01D 29/56* (2013.01); *B01D 29/41* (2013.01); *B29C 48/2545* (2019.02);
(Continued)

(58) Field of Classification Search
CPC ...... B29C 48/693; B29C 48/694; B01D 29/41
See application file for complete search history.

(56) References Cited

U.S. PATENT DOCUMENTS 3,019,905 A * 2/1962 Baker ............... B01D 29/41
                                              210/167.13
3,905,787 A * 9/1975 Roth ............. B01D 46/0089
                                              55/488
(Continued)

FOREIGN PATENT DOCUMENTS

DE  4212928 A1  10/1993
EP  0163742 A1  12/1985
(Continued)

OTHER PUBLICATIONS

English Machine translation of FR780398A.*
(Continued)

*Primary Examiner* — Jason M Greene
*Assistant Examiner* — Eric J McCullough
(74) *Attorney, Agent, or Firm* — BakerHostetler

(57) ABSTRACT

A filter element for filtering a fluid comprises a first clamping ring with an outer ring; a first filter disk; a first inner support plate for supporting the first filter disk and which faces to the outside or to an inner flow channel; a second inner support plate provided with recesses; a second filter disk arranged adjacent the second inner support plate; and a second clamping ring which is connected to the first clamping ring by connecting elements. The filter disks and the inner support plates are arranged inside a housing which is formed by the clamping rings, by at least one outer ring and by outer support plates provided with recesses and covering the filter disks on the outside.

24 Claims, 5 Drawing Sheets

(51) Int. Cl.
  *B29C 48/693* (2019.01)
  *B29C 48/27* (2019.01)
  *B29C 48/25* (2019.01)
  *B29C 48/694* (2019.01)
  *B29C 48/03* (2019.01)

(52) U.S. Cl.
  CPC ........ *B29C 48/2725* (2019.02); *B29C 48/693* (2019.02); *B29C 48/03* (2019.02); *B29C 48/694* (2019.02)

(56) References Cited

U.S. PATENT DOCUMENTS

| | | | |
|---|---|---|---|
| 4,881,313 A | | 11/1989 | Artinyan et al. |
| 4,904,384 A | * | 2/1990 | Potz ..................... B01D 29/114 210/309 |
| 5,449,458 A | | 9/1995 | Gneuss |
| 5,618,422 A | * | 4/1997 | Pelkio ................... B01D 33/23 210/323.1 |
| 5,637,213 A | * | 6/1997 | McEwen .............. B01D 29/114 210/232 |
| 5,779,899 A | * | 7/1998 | Shiomi ................. B01D 25/26 210/346 |
| 2003/0075492 A1 | * | 4/2003 | Kuo ....................... B01D 25/26 210/231 |
| 2003/0213742 A1 | * | 11/2003 | DeCoste ................ B01D 29/15 210/486 |
| 2010/0065486 A1 | * | 3/2010 | Assion ................. B01D 29/012 210/232 |

FOREIGN PATENT DOCUMENTS

| | | | |
|---|---|---|---|
| EP | 0327394 A2 | 8/1989 | |
| EP | 0728511 A1 | 8/1996 | |
| FR | 780398 A * | 4/1935 | ............ B01D 25/02 |
| JP | S51055067 | 5/1976 | |
| JP | S51069966 | 6/1976 | |
| JP | S61098517 | 5/1986 | |
| JP | S62075813 | 5/1987 | |
| JP | S630173308 | 11/1988 | |
| JP | S630315111 | 12/1988 | |
| JP | H02006808 | 1/1990 | |
| JP | H0354719 | 5/1991 | |
| JP | 2003290610 A | 10/2003 | |
| JP | 2007537444 A | 12/2007 | |
| WO | 2005113108 A1 | 12/2005 | |

OTHER PUBLICATIONS

Written Opinion of the International Searching Authority for International Patent Application No. PCT/EP2012/053690, dated Jun. 1, 2012, 15 pages.

International Preliminary Report on Patentability for International Patent Application No. PCT/EP2012/053690, dated Sep. 3, 2013, 17 pages.

Japanese Appln. No. 2013-555896: Reasons for Refusal dated Feb. 1, 2016.

* cited by examiner

FILTER ELEMENT FOR FILTERING A FLUID AND A FILTER UNIT FORMED THEREFROM

BACKGROUND OF THE INVENTION

The invention relates to a filter element for filtering a fluid and a filter unit formed therefrom.

Usually flat screen elements are used for filtering high-viscosity media such as plastic melt. Contaminants in the plastic melt such as aluminum particles or paper residue are deposited in the filter media of the filter elements. The effective filter surface is essentially limited to the opening cross-section of the screen cavity and is directly related to the size of the filtration device, for example with a screen piston changer.

To overcome this disadvantage, filter elements such as the ones described in DE 42 12 928 A1 are used successfully. The disk shape and the plurality of stacked individual disk filter elements can increase the effective filter surfaces considerably in such a filter unit.

In particular for the filtration of plastic melts, the filter units are placed in a screen cavity of a so-called "screen piston changer". However, it was observed that the individual filter elements can bend away with the existing fluid pressure, which can lead to blocking of individual flow paths as well as to damage and subsequent leakage of the filter element.

With increasing contamination, the melt flow is redirected to another screen cavity with a different filter element in many screen piston changers. While the production flow is maintained via the latter, the contaminated filter unit can be freed of the adhering particles through a backwash procedure. For this purpose, a part of the melt is guided through the filter elements of the filter unit in a direction opposite to the one during normal operation such that the particles adhering to the filter media of the filter elements are loosened and rinsed away.

However, the backwash procedure that is possible with normal flat screen elements is not possible with the filter elements of the generic kind using multiple disk filters because the fine metallic filter mesh of the filter elements is not supported in the reverse direction of flow and thus could tear during a backwash.

SUMMARY OF THE INVENTION

The objective of the present invention is therefore to develop a filter element of the type described above such that bending of the filter elements is avoided during production operation and thus to allow a backwash.

This objective, as well as other objectives which will become apparent from the discussion that follows, are achieved, in accordance with the present invention, by providing a filter element wherein the filter disks and the inner support plates are arranged inside a housing which is formed by the clamping rings, by at least one outer ring and by outer support plates provided with recesses and covering the filter disks on the outside.

In terms of the invention, a "ring" not only includes circular shapes but also to closed loops of other shapes such as ellipses or oblong or polygonal contours.

The inner support plates support the filter mesh against the fluid pressure, which acts preferably from the outside during operation of the filter element. With the flow direction during operation, the filter disks lay with a part of the outer edge area lengthwise to the fluid, for example the plastic melt, arriving at th mesh of th filter disk the outside and so that dirt is retained on the outside. The flow continues through the recesses of the inner support plates and into the cavity of the filter element.

Additionally provided are support plates provided with recesses such that the filter disks are covered both towards the inside as well as on the outer sides of the filter element and/or can be supported two-dimensionally. This allows for a change in the flow direction, i.e., also backwash operation during which build-up is rinsed off the filter disk during the reversal of the flow direction.

The structure of a filter element according to the invention is very robust. The filter element can be easily disassembled and cleaned, in particular it can be subjected to thermal treatment without being damaged, for example to burn off plastic melt residue.

In addition, the support plates are preferably kept at a distance from each other by at least one spacer element located on the inside such that an inner hollow space is kept open even at high pressures serves as a flow channel and is open toward the edge of the central bore hole of the filter element.

The spacer elements can be spider web-shaped or wheel-like structures that need to be inserted separately. However, they may also be formed through protruding ledges at the housing ring, clamping ring or outer ring.

The spacer elements may also be formed by curved support plates, which expand concavely or convexly when viewed in the direction of the flow, whereby the curvatures are facing each other such that they contact each other in part, for example with concave shapes in the center and with convex shapes in the peripheral edge regions with the remaining surface areas of the support plates being kept at a distance from each other.

Due to its flexibility, the filter mesh can easily adapt to the three-dimensional shape of the support plates such that it remains supported even if the support area is not in one plane.

The outer support plates can be curved as well, once on the inside to follow the shape of the inner support plates in order to avoid too big an expansion in the filter mesh located in between and to keep it supported over the entire area in both flow directions. In addition, a curvature protruding toward the outside can support an outer flow channel in the same manner by the curvature of at least one filter element resting against an adjacent filter element.

The respective curved inner and outer surfaces of the inner and outer support plates must not necessarily be parallel to each other, i.e., the support plates must not necessarily be designed in the manner of a deep-drawn sheet metal but can also form a bulbous body on both sides.

The connection elements are preferably screws with screw heads and nuts such that disassembly and assembly can be accomplished easily and everywhere with existing tools.

Only the filter disks are wear parts that must be replaced when their metallic and potentially multi-layered filter mesh is badly damaged.

The outer support plates may each be integrated in the clamping ring. However, they can also be placed under the clamping ring as separate plates.

The support plates are preferably designed as perforated plates that are easy to manufacture and allow for small area support of the filter mesh through their grid structure.

The filter disks preferably have an inner ring and an outer ring, which are preferably made of a non-ferrous metal in particular of copper. This creates a metallic seal, once at the inner circumference as a seal against a support tube located on the inside on which the filter elements are stacked and once at the outer circumference as a seal against the outer ring.

It is also possible to manufacture the ring-disk-shaped filter disks over-dimensioned at the inner and/or outer edge compared to the adjacent components and then to press them appropriately onto the adjacent components.

The outer ring can be designed in one place with the clamping ring or the inner support plate.

One preferred embodiment of the invention provides the use of similar inner support plates that arrive at the outer circumference each in the center of a partial outer ring. This results in a T-shaped cross-section at the edge of each inner support plate. To form a filter element, two pieces each of a total of three similar parts can be used, namely two identical inner support plates with a partial outer ring, two identical filter disks and two identical outer support plates, which at the same time integrate the clamping ring on the edges. This enables cost-effective manufacturing and storage as well as simple handling.

A filter unit built of several filter elements according to the invention as in claim 12 can be built easily and also disassembled easily for cleaning purposes because the filter elements according to the invention are not sensitive to knocks and hits due to their massive outer housing consisting of outer ring, support plates and clamping rings.

By the fact that the connection elements protrude at the face sides of the finished filter element, the protrusions can at the same time also serve as spacers forming flow channels between adjacent filter elements. Thus, filter elements stacked on top of each other support each other and cannot be bent away by the fluid pressure.

One preferred embodiment provides for an additional coarse filter that encloses the filter elements and that extends between the bottom of the filter unit and the bottom of the screen cavity, into which the filter unit is placed, and its head plate.

The coarse filter element retains, for example, particles such as aluminum or paper residue, which are present in particular during plastic recycling and which may be sufficient in size that they no longer or only with great difficulty can be removed from the flow channel between the filter elements by back-washing. This achieves a cascade filtration where coarse particles can no longer reach the inside of the actual filter unit. The task of the latter is then limited to the separation of fine items or agglomerates, which leads to a significantly increased service life.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
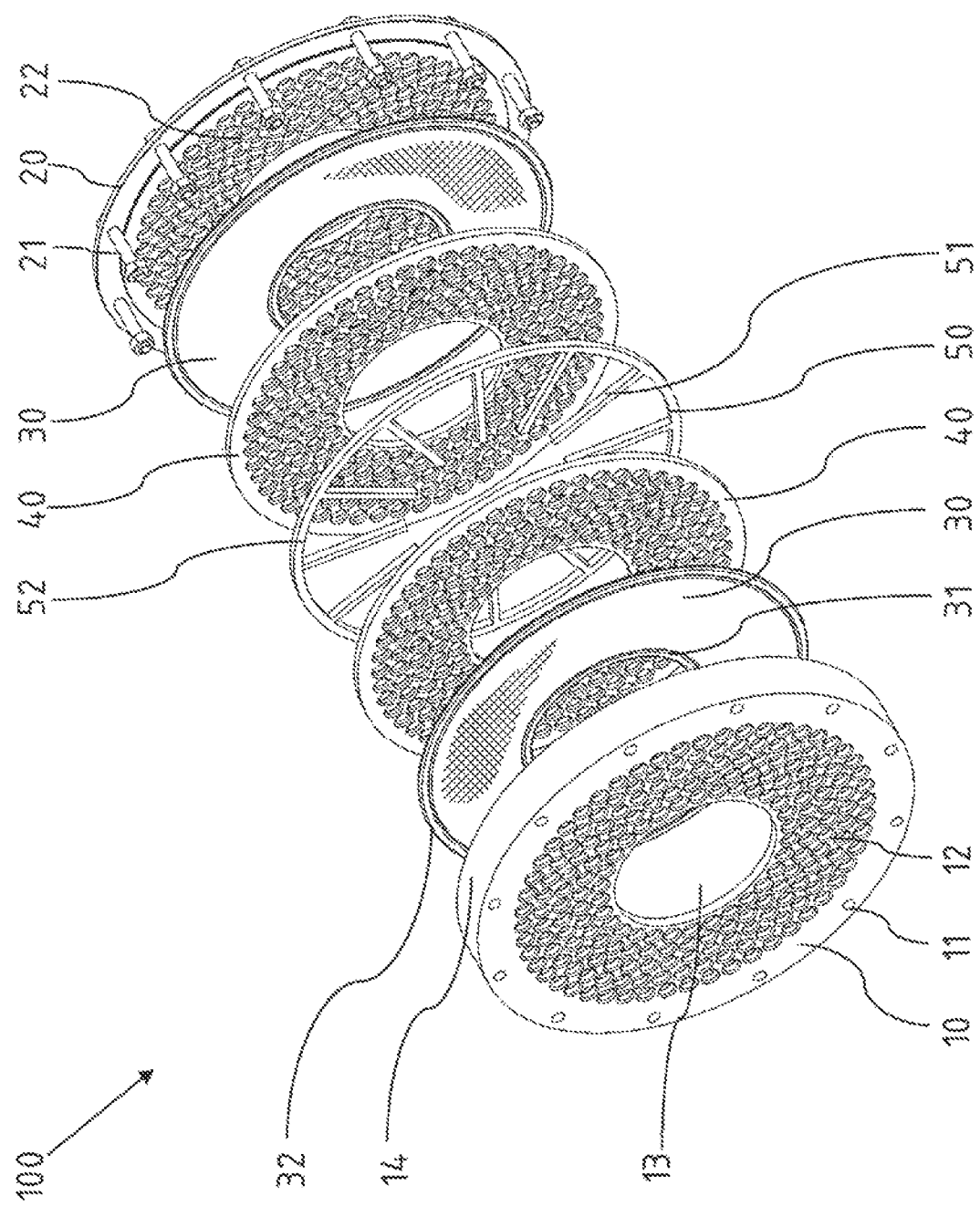
FIG. 1 is an exploded view of a filter element according to a first embodiment.

The preferred embodiments of the present invention will ow be described with reference to FIGS. 1-5 of the drawings. Identical elements in the various figures are designated with the same reference numerals.

FIG. 1 shows a filter element 100 with its components arranged in correct positon prior to assembly.

The main components from right to left in the order of assembly are:

(a) a clamping ring 10 with a through-hole 11 for accepting screws, with an integrated cylindrical outer ring 14 and an integrated support plate 12;

(b) a first ring-disk-shaped filter disk 30, which is bordered at its inner edge by an inner ring 31 and at its outer edge by an outer ring 32, said rings 31, 32 being made of a copper profile;

(c) a first inner support plate 40 which is designed as a serrated disk.

(d) a spacer element 50 that keeps the first inner support plate 40 at a distance from a second inner support plate 40;

(e) a second filter disk 30; and (f) a clamping ring 20 with through-holes for accepting screws 21. In this embodiment, the clamping ring 20 has an integrated central support plate 22 as does the clamping ring 10.

Figure 2:
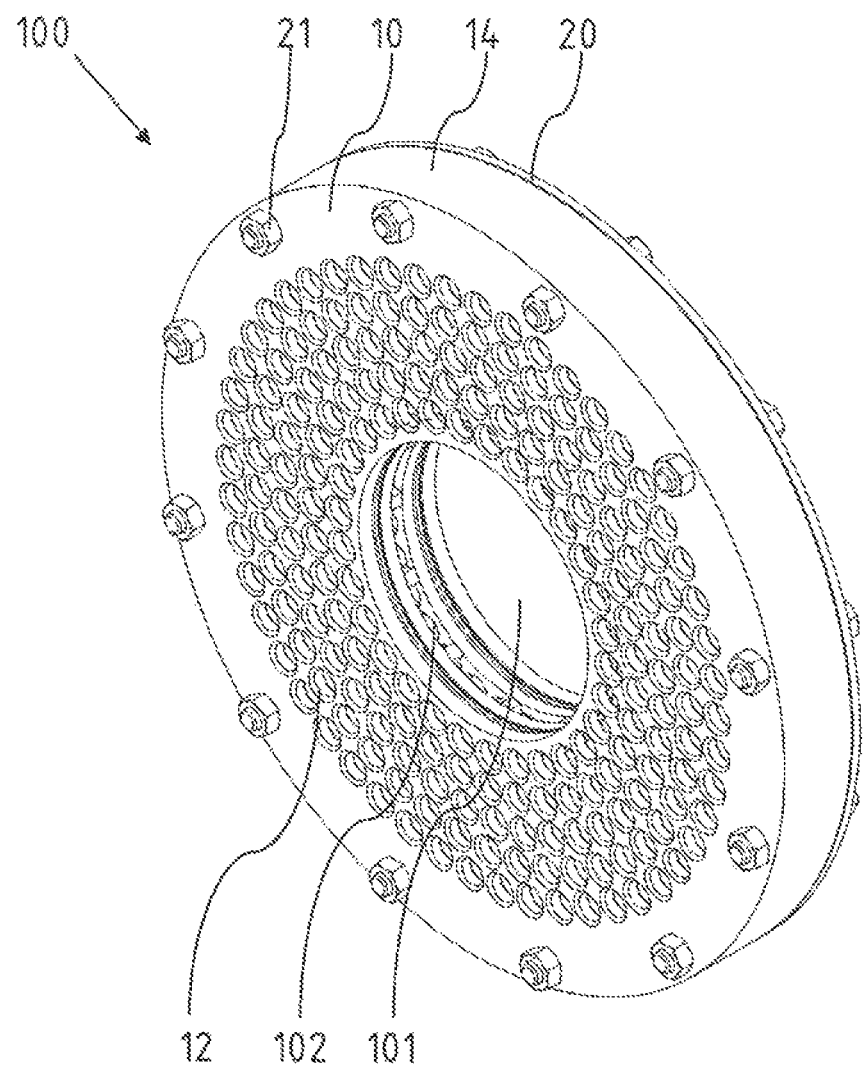
FIG. 2 is a perspective view of an assembled filter element according to the first embodiment.

FIG. 2 shows the fully assembled filter element 100. Visible therein is that where the spacer element 50 is arranged in the center, a flow channel 102 is formed at the finished filter element 100 and is open towards the edge of the inner receiving bore hole 101.

Figure 3:
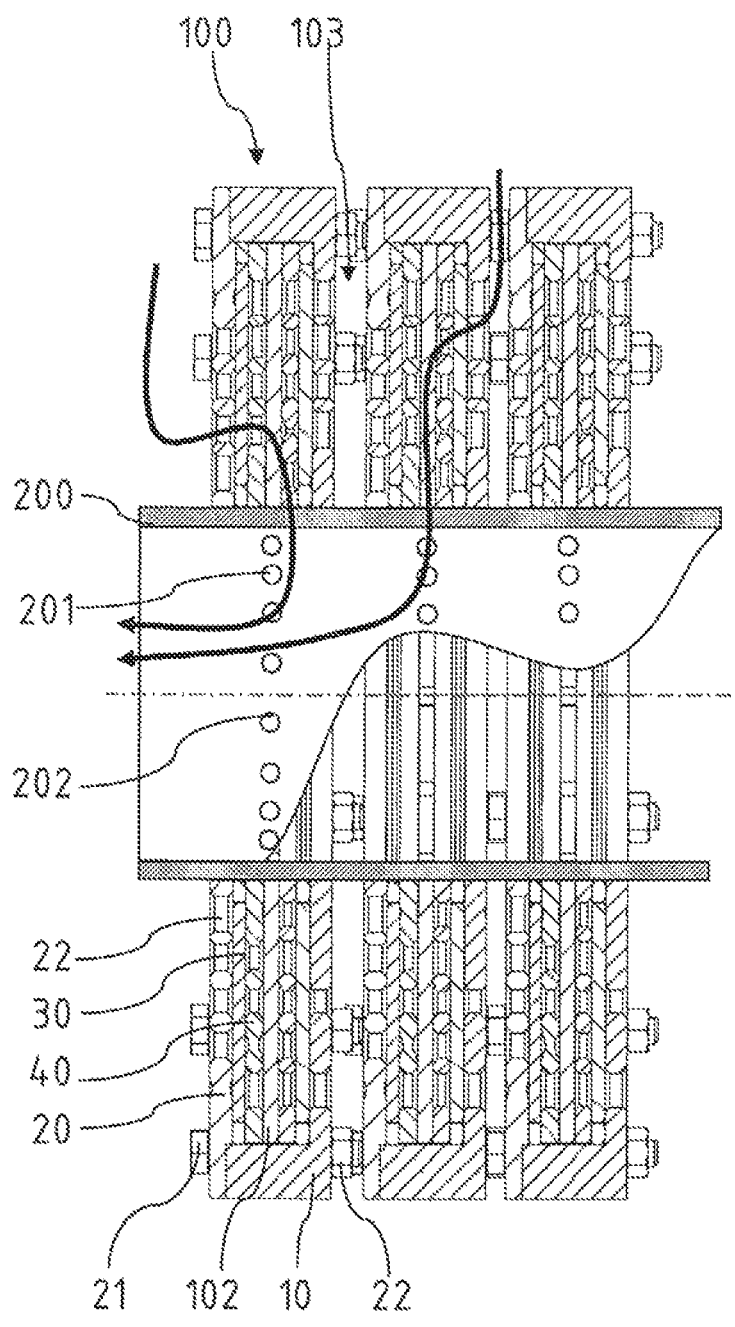
FIG. 3 is section of several filter element tacked on support tube.

FIG. 3 shows a stack of a total of three filter elements 100 that are mounted on a support tube 200 indicated only schematically. The inner rings 31 of the filter disks 30 rest tightly on the outer surface of the support tube 200. The outer rings 32 produce a seal against the inner surface of the outer ring 14. Through the screw heads and the screw shaft protrusions or the nuts, respectively, adjacent filter elements 100 are kept at a distance from each other forming an outer flow channel 103 between two filter elements 100.

Figure 4:
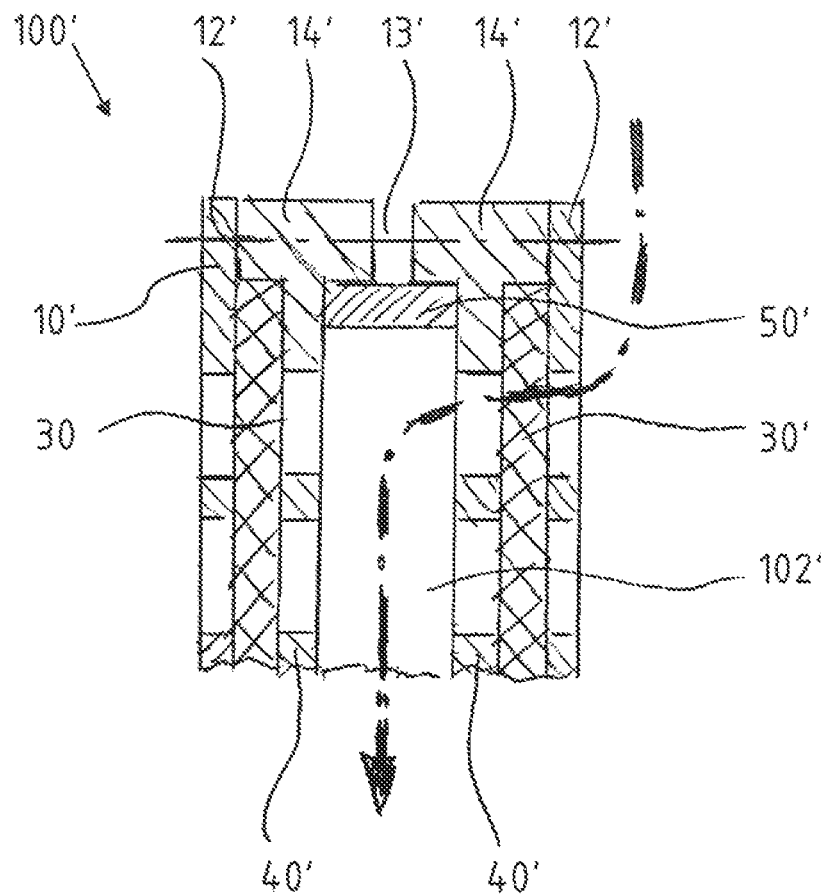
FIG. 4 is a detail from the edge of a sectional view of a second embodiment of filter element.

The flow direction during production operation is as indicated by the arrows: From the outer circumference of the filter unit 100 into the outer flow channels 103; from there through the filter disks 30 to the inner flow channels 102. The latter are open towards the central receiving bore hole 101 in the filter elements 100 as can be seen in FIGS. 2 and 4. In this manner, the fluid can discharge through the bore holes 201 202 in the tube casing of the support tube 200 into its inner space.

FIG. 4 shows a detail from the edge area of a filter element 100' according to a second embodiment. The inner support plate 40' transitions smoothly into a partial outer ring 14' such that a T-shaped cross-section is created in the edge area of this unit.

Through the preferably mirror-symmetrical design, the two identical support plates 40' with the partial outer ring 14' can be used for both sides. A spacer ring 50' is clamped in-between and ensures a seal of the inner cavity 102' towards the outer circumference. To enable the seal, the distance ring 50' has a greater height than the two protrusions of the partial outer ring 14' that point inward together. Thus, an air gap 13' remains between the partial outer rings 14'. This allows for securing to each other two identical units of outer support plates 12', filter elements 30' and inner support plates 40' by enclosing a spacer ring 50' using a screw connection, which is here only indicated, such that a complete filter element 100' is created, which is a unit that is sealed towards the outside. The outer support plates 12' are designed as clamping rings 10' at their outer edges, i.e., they do not have an opening towards the inner cavity in this area but only recesses to receive the screws and other connection elements.

Figure 5:
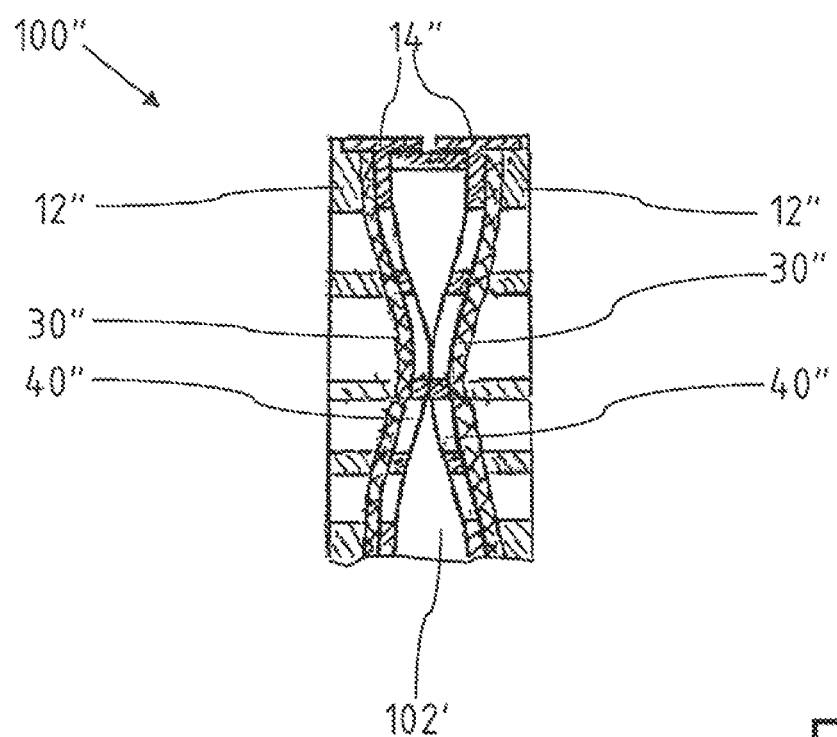
FIG. 5 is a detail from the edge of a sectional view of a third embodiment of a filter element.

FIG. 5 shows a third embodiment of a filter element 100", which at the edge is designed like the second embodiment of the filter element 100" described above, namely with partial outer rings 14", which the outside follow the inner support plates 40". However, in this embodiment, the support plats 40" have a concave curvature relative to the flow direction from the outside to the inside. The protruding areas contact each other, however, the concave areas are preferably not ring-shaped across the entire partial circle but rather consist of several individual humps such that radial flow paths will also remain open from the outer areas of the cavity 102' towards the outlet opening at the inner edge.

With this embodiment, the outer support plates 12" with the integrated clamping rings are flat at the outer surface and are parallel to the contour of the inner support plate on the inside. In this manner, an also three-dimensionally curved filter element 30" that is sandwiched in between is supported in both flow directions without over-tending.

There has thus been shown and described a novel filter element for filtering a fluid, and a filter unit formed therefrom, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A filter element, comprising:
   a first clamping ring with an outer ring and a first integrated support plate having perforations extending directly therethrough;
   a metallic first filter disk adapted to filter a plastic melt fluid, said first filter disk having opposed first and second surfaces, said first surface of said first filter disk supported by said first integrated support plate;
   a first inner support plate having perforations extending therethrough, said first inner support plate configured to support said second surface of said first filter disk;
   a second inner support plate having perforations extending therethrough, said second inner support plate spaced apart from said first inner support plate to form an inner flow channel between said first inner support plate and said second inner support plate;
   a metallic second filter disk adapted to filter the plastic melt fluid, said second filter disk having opposed first and second surfaces, said first surface of said second filter disk supported by said second inner support plate;
   a second clamping ring with a second integrated support plate having perforations extending directly therethrough, said second integrated support plate configured to support said second surface of said second filter disk;
   a spacer element positioned between said first inner support plate and said second inner support plate to form said inner flow channel; and
   a plurality of connecting elements removably coupling said first clamping ring and said second clamping ring to clamp said first filter disk, said first inner support plate, said second inner support plate, said spacer element, and said second filter disk therebetween, such that said first integrated support plate, said first filter disk, said first inner support plate, said second inner support plate, said second filter disk, said spacer element, and said second integrated support plate are configured to be disassembled and reassembled,
   wherein said first integrated support plate comprises opposed first and second surfaces, wherein said second surface of said first integrated support plate supports said first surface of said first filter disk, wherein said first surface of said first integrated support plate substantially defines a first planar surface extending to peripheries of said first clamping ring intersecting with said outer ring,
   wherein said second integrated support plate comprises opposed first and second surfaces, wherein said first surface of said integrated second support plate supports said second surface of said second filter disk, wherein said second surface of said second integrated support plate substantially defines a second planar surface extending to the peripheries of said second clamping ring,
   wherein peripheral edges of said first and second inner support plates are each flush to a circumferential inner surface of said outer ring,
   wherein said inner flow channel extends through said first filter disk, said first inner support plate, said second inner support plate, and said second filter disk,
   wherein said first filter disk is disposed between said first clamping ring and said first inner support plate, and said second filter disk is disposed between said second clamping ring and said second inner support plate, and
   wherein said first filter disk and said second filter disk each have an outer diameter extending circumferentially around said first filter disk and said second filter disk, respectively, said outer diameters of said first and second filter disks being configured to contact said outer ring of said first clamping ring such that a seal is formed between said first clamping ring and said first and second filter disks.

2. The filter element according to claim 1, wherein said connecting elements are headed screws and nuts.

3. The filter element according to claim 1, wherein said first inner support plate and said second inner support plate have a curvature configured to maintain space between said first inner support plate and said second inner support plate to form said inner flow channel.

4. The filter element according to claim 1, wherein said first inner support plate and said inner second support plate are curved concavely towards each other.

5. The filter element according to claim 1, wherein said first clamping ring, said outer ring and said second integrated support plate are formed as one piece.

6. The filter element according to claim 1, wherein said first and second inner support plates have matching size and shape and terminate at outer circumferences that each have a T-shaped cross-section as taken along a plane extending along a longitudinal axis of the filter element.

7. A filter unit, comprising:
   a plurality of filter elements according to claim 1; and
   a support tube extending along the longitudinal axis axes and having an outer diameter, an inner diameter, and an inner space, said support tube having bore holes extending through said support tube from said outer diameter to said inner diameter to allow flow of the fluid through said bore holes and into said inner space, said plurality of filter elements stacked adjacent to one another along said support tube such that said plurality of filter elements surround said outer diameter of said support tube, an inlet flow channel between each two adjacent ones of said filter elements, each said inlet flow channel is in fluid communication with at least one of said inner flow channels, and each of said inner flow channels is in fluid communication with said inner space via at least one of said bore holes.

8. The filter unit according to claim 7, further comprising a coarse filter element enclosing said filter elements.

9. The filter unit according to claim 7, wherein for each filter element said connecting elements protrude beyond said first and second clamping rings to maintain a space between adjacent ones of said filter elements and thereby form said inlet flow channel.

10. The filter unit according to claim 9, wherein said connecting elements are headed screws and nuts.

11. The filter element according to claim 1, wherein said perforations of said first and second integrated support plates are defined by a plurality of round through-holes.

12. The filter element according to claim 11, wherein said perforations of said first and second inner support plates are defined by a plurality of round through-holes.

13. The filter element according to claim 12, wherein:

said plurality of round through-holes of said first integrated support plate supports said first surface of said first filter disk during a backflow operation in which said plastic melt fluid flows from said inner flow channel and outward through said plurality of round through-holes of said first integrated support plate, said plurality of round through-holes of said first inner support plate supports said second surface of said first filter disk during a standard flow operation in which said plastic melt fluid flows inwardly through said plurality of round through-holes of said first integrated support plate to said inner flow channel, said plurality of round through-holes of said second inner support plate support said first surface of said second filter disk during said standard flow operation in which said plastic melt fluid further flows inwardly through said plurality of round through-holes of said second integrated support plate to said inner flow channel, and said plurality of round through-holes of said second integrated support plate support said second surface of said second filter disk during said backflow operation in which said plastic melt fluid further flows from said inner flow channel and outward through said plurality of round through-holes of said second integrated support plate.

14. The filter element according to claim 1, wherein the peripheral edges of said first filter disk, first inner support plate, second inner support plate, and second filter disk each contact the circumferential inner surface of said outer ring at a perpendicular angle.

15. The filter element according to claim 1, wherein the peripheral edge of said spacer element is flush to the circumferential inner surface of said outer ring.

16. The filter element according to claim 15, wherein the peripheral edge of said spacer element contacts the circumferential inner surface of said outer ring at a perpendicular angle.

17. A filter element, comprising:

a first clamping ring with an outer ring and a first integrated support plate having perforations extending directly therethrough;

a metallic first filter disk adapted to filter a plastic melt fluid, said first filter disk having opposed first and second surfaces, said first surface of said first filter disk supported by said first integrated support plate;

a first inner support plate having perforations extending therethrough, said first inner support plate configured to support said second surface of said first filter disk;

a second inner support plate having perforations extending therethrough, said second inner support plate spaced apart from said first inner support plate to form an inner flow channel between said first inner support plate and said second inner support plate;

a metallic second filter disk adapted to filter the plastic melt fluid, said second filter disk having opposed first and second surfaces, said first surface of said second filter disk supported by said second inner support plate;

a second clamping ring with a second integrated support plate having perforations extending directly therethrough, said second integrated support plate configured to support said second surface of said second filter disk;

a spacer element positioned between said first inner support plate and said second inner support plate to form said inner flow channel; and a plurality of connecting elements removably coupling said first clamping ring and said second clamping ring to clamp said first filter disk, said first inner support plate, said second inner support plate, said spacer element, and said second filter disk therebetween, such that said first integrated support plate, said first filter disk, said first inner support plate, said second inner support plate, said second filter disk, said spacer element, and said second integrated support plate are configured to be disassembled and reassembled, wherein said first and second inner support plates have matching size and shape and terminate at outer circumferences that each have a T-shaped cross-section as taken along a plane extending along a longitudinal axis of the filter element, wherein the outer circumference of said spacer element abuts radially-inward portions of said first and second inner support plates having T-shaped cross-sections, wherein said inner flow channel extends through said first filter disk, said first inner support plate, said second inner support plate, and said second filter disk, wherein said first filter disk is disposed between said first clamping ring and said first inner support plate, and said second filter disk is disposed between said second clamping ring and said second inner support plate, and wherein said first filter disk and said second filter disk each have an outer diameter extending circumferentially around said first filter disk and said second filter disk, respectively, said outer diameters of said first and second filter disks being configured to contact said outer ring of said first clamping ring such that a seal is formed between said first clamping ring and said first and second filter disks.

18. The filter element according to claim 17, wherein said outer circumferences of said first and second inner support plates having T-shaped cross-sections define a circumferential air gap therebetween.

19. The filter element according to claim 17, wherein said first integrated support plate comprises opposed first and second surfaces, wherein said second surface of said first integrated support plate supports said first surface of said first filter disk, wherein said first surface of said first integrated support plate substantially defines a first planar surface extending to the peripheries of said first clamping ring intersecting with said outer ring.

20. The filter element according to claim 19, wherein said second integrated support plate comprises opposed first and second surfaces, wherein said first surface of said second integrated support plate supports said second surface of said first filter disk, wherein said second surface of said second integrated support plate substantially defines a second planar surface extending to the peripheries of said second clamping ring.

21. The filter element according to claim 20, wherein peripheral edges of said first and second inner support plates are each flush to a circumferential inner surface of said outer ring.

22. The filter element according to claim 1, wherein the spacer element is in the form of a ring.

23. The filter element according to claim 1, wherein said inner flow channel is configured to receive the plastic melt fluid in a first direction during a first configuration and in a second direction during a second configuration, the second direction being opposite the first direction.

24. The filter element according to claim 1, wherein the first and second filter disks are configured to be separated from and removed from the filter element.

\* \* \* \* \*